Patented Oct. 7, 1941

2,257,825

UNITED STATES PATENT OFFICE 2,257,825

POLYAMIDE COMPOSITION

Gordon T. Vaala, Wilmington, Del., assignor to E. I. du Pont de Nemours & Company, Wilmington, Del., a corporation of Delaware No Drawing. Application August 30, 1939, Serial No. 292,747

8 Claims. (Cl. 260—36)

This invention relates to new compositions of matter, and more particularly to new and valuable compositions comprising synthetic linear polyamides.

These polyamides, the utility of which is enhanced by the practice of this invention, are described in U. S. Patents 2,071,250, 2,071,253 and 2,130,948. They are of two types, namely, those derived from monoaminomonocarboxylic acids and their amide-forming derivatives, and those derived from the reaction of suitable diamines with suitable dicarboxylic acids or amide-forming derivatives of dibasic carboxylic acids. It will be noted that the polyamides are derived from bifunctional amide-forming derivatives. On hydrolysis with mineral acids the polyamides revert to bifunctional amide-forming reactants. For example, a polyamide derived from a diamine and a dibasic acid yields, in hydrolysis with hydrochloric acid, the dibasic acid and the diamine hydrochloride. The amide groups in these polyamides form an integral part of the main chain of atoms in the polymer.

Although the synthetic linear polyamides as a class are microcrystalline and have fairly high and sharp melting points they can be formed into many useful objects by spinning, extruding, or otherwise forming the object from the molten polyamide. To improve the properties of the products thus formed, it is generally desirable to subject them to a process of cold drawing (application of tensile stress), or to a process of cold working, e. g., cold rolling (application of compressive stress), or subjecting them to both cold drawing and cold working. The products thus formed are unusually strong, have high melting points, and for many purposes are quite satisfactory. For certain uses, however, and particularly for use in the form of films, sheets, and the like, improved working qualities, greater durability and toughness at low temperatures, and improved clarity are desired. Accordingly, the discovery of appropriate modifying agents for the polyamides is very important.

This invention has an as object, therefore, the preparation of new compositions of matter comprising mixtures of the said polyamides with compounds which improve the properties of the polyamides along lines indicated above. Further objects will appear hereinafter.

These objects are accomplished by incorporating or mixing with the polyamides ether alcohol polycarboxylic acid esters. These compounds are esters of ether alcohols and polycarboxylic acids and may be referred to as ether alcohol polycarboxylic acid esters, or merely as ether esters.

I have found that whereas esters of simple monohydric alcohols with polybasic acids are substantially incompatible with the polyamides, the ether esters are compatible with them over a wide range, yielding products having good low temperature toughness and durability.

These ether esters, in general, are high boiling liquids which are noncorrosive and substantially inactive toward the polyamide. Two or more of them often may advantageously be employed together. As a rule, those boiling above 225° C. or, better above 275° C. are to be preferred.

For most purposes quantities of the ether esters, ranging from 1 to 65% and preferably 5 to 50% by weight of the polyamide, are used to greatest advantage, the amount used depending on the nature of the ether ester, the polyamide, and the properties desired in the final product. When used in combination with plasticizers, e. g., alkylarylsulfonamides, 20–35% of the ether ester is preferred. Surprisingly, the addition of even fairly large quantities of the ether ester does not materially lower the melting point of the product. While a low melting point is desirable for certain uses, for many others a high melting point is advantageous and desirable. For example, in molded articles it is highly desirable to incorporate sufficient modifying agents to eliminate brittleness and to develop low temperature toughness without lowering the softening point, as a low softening point gives rise to objectionable deformations with changes in temperature.

Polyamides mixed with ether esters are especially useful in sheet form for use as transparent wrapping foil, where tasteless, odorless products are required. Transparent films for use as wrapping and packaging materials must be durable over a wide temperature range, and must not be brittle at low temperatures. Ether esters are especially useful in improving the low temperature toughness of thin sheets of polyamides for use in such applications.

A very convenient method for incorporating the ether ester in the polyamide consists in immersing the polyamide in sheet form in a solution of the ether ester in a nonsolvent for the polyamide. Concentrated or saturated solutions of the ether ester in aqueous alcohol are especially useful. Under these conditions the ether ester is absorbed by the polyamide sheet. After the desired amount of ether ester has been absorbed by the polyamide, the sheet is removed and dried. The effect of the ether ester is enhanced by the presence within the polyamide sheet of a small amount of alcohol or water. The amount of water which the polyamide sheet absorbs from the air under ordinary conditions of humidity is usually sufficient for this purpose.

Other methods of incorporating the ether ester may also be used. For example, the polyamide and the ether ester can be dissolved in a mutual solvent and the solution used for making filaments, films, rods, and the like, either by evaporation or coagulative methods. The lower fatty acids, e. g., formic acid, are useful solvents for this purpose. Phenols can also be used to adantage. Mixtures of chloroform and methanol are especially useful solvents for polyamide interpolymers. The ether esters of this invention may also be incorporated by direct blending with molten polymer.

This invention is described more specifically in the following examples, in which parts are by weight.

Example I

A polyamide interpolymer was prepared by heating 450 parts of hexamethylene diammonium adipate, 300 parts of caprolactam, and 50 parts of water for one hour at 265–270° C. under the generated pressure (300 lbs./sq. in.). The water was bled off and heating continued for three hours under reduced pressure (100 mm.). The molten polymer was then extruded in ribbon form. It had an intrinsic viscosity of 1.06, melted at 174–177° C., and could be spun into fibers.

Eighty (80) parts of this interpolymer and 20 parts of diethoxyethyl adipate were dissolved in a mixture of 240 parts of chloroform and 120 parts of methanol by stirring at 60° C. for two hours. The solution was cooled to 20° C. and a portion poured onto a polished metal plate at the same temperature. By means of a leveling blade the solution was spread to an even layer and the solvent allowed to evaporate. The final traces of solvent were removed from the film by warming the plate to about 60° C. for two hours. After standing at room temperature for several hours, the films were stripped from the metal plate. The films were firm and clear and had good "body" such as is required for transparent wrapping foil. Films thus cast (0.001" thick) were subjected to a durability test which was carried out in the following manner. Standard size bags were fabricated from the said polyamide films and each bag filled with a fixed weight of beans. The bags were enclosed in chambers maintained at 0° F. and 7% relative humidity and the bags caused to fall from a fixed height, and the number of falls without breaking noted. Under these conditions, the bags prepared from films containing the diethoxyethyl adipate withstood nine times as many falls as bags fabricated from similar polyamide sheeting containing no modifying agent. When tested on the standard Olsen tensile strength machine, the film showed an elongation of 408% and a tensile value of 4000 lbs./sq. in. based on the original dimensions.

Example II

Eighty-two and one-half (82.5) parts of the interpolymer described in Example I and 20.6 parts of dibutoxyethoxyethyl phthalate were dissolved in a mixture of 330 parts of chloroform, 165 parts of methanol, and 82.5 parts of butanol by stirring at 60° for two hours. Films were prepared from this composition by casting on a metal plate as described in Example I. The film after removal from the plate, was pliable but firm and remarkably clear. Film having a thickness of 0.00068", when subjected to the durability test at 0° F., (as described in Example I) withstood eleven times as many falls as similar polyamide sheeting containing no modifying agent. The film had an elongation of 270% and a tensile value of 2800 lbs./sq. in. based on the original dimensions.

Example III

Twenty (20) parts of the interpolymer described in Example I, 14 parts of amylbenzenesulfonamide, and 8 parts of diethoxyethyl adipate were dissolved in 100 parts of a mixture of equal parts of chloroform and methanol by stirring at 60° C. for two hours. The solution was cooled to room temperature and a portion poured onto a clean glass plate at the same temperature. By means of a leveling blade, the solution was spread to an even layer and the solvent allowed to evaporate in the open air. The final traces of solvent were removed from the film by aging at 65° C. for two hours. The film, after removal from the glass plate by soaking in water, was brilliantly clear and had a marked elasticity. It melted at 155–160° C. when tested on a copper block in the open air. When tested on the standard Olsen tensile strength machine, it showed an elongation of about 350% and tensile values of 1900 and 6500 lbs./sq. in. on the original and break dimensions respectively.

Example IV

A polyester-polyamide interpolymer was prepared by heating 265.6 parts of ethylene glycol, 584.3 parts of adipic acid and 146.9 parts of hexamethylene diammonium adipate at 155° C. under atmospheric pressure for 18 hours; at 200° C. under atmospheric pressure for three hours; at 200° C. under 20 mm. of mercury pressure for two hours, followed by 96 hours at 200° C. under 2–3 mm. pressure of mercury. All heatings were carried out in an atmosphere of carbon dioxide. The polymer had a melt viscosity of 1070 poises at 155° C., melted at 96–105° C., and exhibited fiber-forming properties.

Twelve (12) parts of this polymer and 1.4 parts of diethoxyethyl adipate were dissolved in 40 parts of a mixture of equal parts of ethanol and ethyl acetate by stirring at room temperature. A film was prepared from this composition by casting onto a glass plate as described in Example III. The film, after removal from the glass plate by soaking water, was elastic and tough. It melted at 112–114° C. when tested on a copper block in the open air.

Examples of additional synthetic linear polyamides with which the ether esters advantageously may be mixed are polytetramethylene sebacamide, polypentamethylene adipamide, polypentamethylene sebacamide, polyhexamethylene suberamide, polyhexamethylene sebacamide, polyoctamethylene adipamide, polydecamethylene carbamide, poly-p-xylene sebacamide, polydecamethylene-phenylene diacetamide, and the polyamide derived from 3,3'-diaminodipropyl ether and adipic acid. Polymerized 6-aminocaproic acid, polymerized 9-aminononanoic acid and polymerized 11-aminoundecanoic acid are further examples of linear polyamides which may be used. The invention also is applicable to mixtures of polyamides. In general, the synthetic linear polymers do not possess fiber-forming properties unless they have an intrinsic viscosity above 0.4 as defined in U. S. P. 2,130,948. Likewise, to secure the maximum utility for making films, ribbons, tubes, rods, and the like, the polyamide should have an intrinsic viscosity above 0.4 and preferably above 0.6.

Instead of the polyamides mentioned above, which are obtainable from bifunctional polyamide-forming reactants as essentially sole reactants, I may use the linear polymers obtained by including with the polyamide-forming reactants used to prepare the polyamides, other bifunctional reactants, such as glycols and hydroxy acids. As examples of such modified polyamides may be mentioned those derived from diamides, dibasic acids and glycols, those derived from amino acids, dibasic acids and glycols, and those derived from amino acids and hydroxy acids. Although these products contain ester linkages, they still may be referred to as polyamides since they contain a plurality of amide-linkages and retain many of the desirable properties of the simple polyamides. Like the simple polyamides, these modified polyamides do not exhibit fiber-forming properties until their intrinsic viscosity is at least 0.4.

As additional examples of ether esters which may be used in making the compositions of this invention may be mentioned the ether esters obtainable by the esterification of oxalic, malonic, succinic, glutaric, pimelic, suberic, azelaic, sebacic, hexahydrophthalic, dihydronaphthalene dicarboxylic, tricarballylic and phthalic acids with the mono methyl, ethyl, propyl, butyl, amyl, hexyl, heptyl, octyl, cyclohexyl or benzyl ethers of ethylene glycol. The corresponding monoethers of diethyleneglycol, triethyleneglycol or other glycols also may be used. The monoethers of propylene and butylene glycols and the mono ethers of poly-propylene and poly-butylene glycols are additional examples of suitable alcohols for the preparation of ether esters. Esters of ether alcohols such as those listed above with unsaturated acids such as maleic, fumaric, itaconic, and mesaconic acids may also be used.

Ether esters suitable for preparing the compositions of this invention may also be prepared from ether alcohols and ether acids such as diglycolic acid, dithioglycolic, diphenylolpropane diacetic acid $p,p'$-(HOOCCH$_2$OC$_6$H$_4$C(CH$_3$)$_2$C$_6$H$_4$OCH$_2$COOH)

resorcinal diacetic acid (m-HOOCCH$_2$OC$_6$H$_4$OCH$_2$COOH)

and $\alpha,\alpha'$-dicarboxy diethyl ether and $\beta,\beta'$-dicarboxy diethyl ether (HOOCCH(CH$_3$)OCH(CH$_3$)COOH)

and

HOOCCH$_2$CH$_2$OCH$_2$CH$_2$COOH

This invention is not limited to compositions of polyamides and ether esters alone. As already indicated the advantageous effects of the ether ester are increased by the presence of a small amount of water. Other hydroxylated nonsolvents, particularly alcohols such as methanol, propanol, isobutanol, benzyl alcohol, cyclohexanol, hexamethyleneglycol, and glycerol have a similar effect. Moreover, there may be associated with the polyamide ether ester composition plasticizers such as dibutyl phthalate, tricresyl phosphate, high-boiling monomeric amides and cyclic ketones. Particularly valuable products, furthermore, are obtained by using the modifying agents of this invention in conjunction with phenols, e. g., tertiary butyl phenol, diamyl phenol, resorcinol, carvacrol, 2-(bis-4-hydroxyphenyl) propane, and p-hydroxydiphenyl, or with aryl or alkylaryl sulfonamides, such as amylbenzenesulfonamide, diamylbenzenesulfonamide, hexylbenzenesulfonamide, and octylbenzenesulfonamide. The compositions of this invention in addition may contain other types of modifying agents, such as luster modifying agents, pigments, dyes, antioxidants, oils, antiseptics or cellulose derivatives.

The polyamide-ether ester compositions are useful in many forms and for many purposes. Typical applications are yarns, fabrics, bristles, surgical sutures, fishing leaders, fish lines, dental floss, rods, tubes, films, ribbons, sheets, safety glass interlayer, molded articles, adhesives, electrical insulation (e. g., for wires), impregnating agents, and coating compositions. An advantage which these compositions have over unmodified polyamides is that they are more pliable at low temperatures. This is most important in connection with the use of the product in sheet form. Typical uses for the material in this form are wrapping foils, leather applications, raincoats, shower curtains, and umbrellas. By reason of the fact that superpolyamide-ether ester compositions may be melted and thus extruded, they can be formed into tubing and coated directly onto fabric and metals. The compositions also are useful in the preparation of blown articles, such as toys and hollow toiletware. Furthermore, they may be compression molded, i. e., blanked or stamped out in shaped articles.

As many apparently widely different embodiments of this invention may be made without departing from the spirit and scope thereof, it is to be understood that I do not limit myself to the specific embodiments thereof, except as defined in the appended claims.

I claim:

1. A composition of matter comprising a synthetic linear polyamide and an ester derived by esterification of a polycarboxylic acid with a monohydric ether alcohol, the said polyamide being the reaction product of a polymer-forming composition comprising reacting materials selected from the class consisting of (a) polymerizable monoamino-monocarboxylic acids, and (b) mixtures of diamine and dibasic carboxylic acid; the said polyamide having an intrinsic viscosity of at least 0.4.

2. A composition of matter comprising a synthetic linear polyamide and an ester derived by esterification of a polycarboxylic acid with a monohydric ether alcohol, the said polyamide being the reaction product of a polymer-forming composition comprising reacting materials selected from the class consisting of (a) polymerizable monoamino-monocarboxylic acids, and (b) mixtures of diamine and dibasic carboxylic acid; the said polyamide being one which can be formed into fibers showing by characteristic X-ray patterns orientation along the fiber axis.

3. A composition of matter comprising a synthetic linear polyamide and an ester derived by esterification of a polycarboxylic acid with a monohydric ether alcohol, the said polyamide being the reaction product of a polymer-forming composition comprising a polymerizable monoaminomonocarboxylic acid and having an intrinsic viscosity of at least 0.4.

4. A composition of matter comprising a synthetic linear polyamide and an ester derived by esterification of a polycarboxylic acid with a monohydric ether alcohol, the said polyamide being the reaction product of a polymer-forming composition comprising a mixture of diamine and dibasic carboxylic acid and having an intrinsic viscosity of at least 0.4.

5. A compostion of matter comprising a synthetic linear polyamide and an ester derived by esterification of a dicarboxylic acid with a monohydric ether alcohol, the said polyamide being the reaction product of a polymer-forming composition comprising reacting materials selected from the class consisting of (a) polymerizable monoamino-monocarboxylic acids, and (b) mixtures of diamine and dibasic carboxylic acid; the said polyamide having an intrinsic viscosity of at least 0.4.

6. A composition of matter comprising a synthetic linear polyamide, an arylsulfonamide and an ester derived by esterification of a polycarboxylic acid with a monohydric ether alcohol, the said polyamide being the reaction product of a polymer-forming composition comprising reacting materials selected from the class consisting of (a) polymerizable monoaminomonocarboxylic acids, and (b) mixtures of diamine and dibasic carboxylic acid; the said polyamide having an intrinsic viscosity of at least 0.4.

7. The composition of matter set forth in claim 1 in which the said ester is dibutoxyethoxyethyl phthalate.

8. The composition of matter set forth in claim 1 in which the said ester is diethoxyethyl phthalate.

GORDON T. VAALA.